United States Patent
Krause

(10) Patent No.: US 6,364,490 B1
(45) Date of Patent: *Apr. 2, 2002

(54) VIRTUAL IMAGE PROJECTION DEVICE

(75) Inventor: Detlef Krause, Bad Hoenningen (DE)

(73) Assignee: Vantage Lighting Incorporated, San Rafael, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/385,310

(22) Filed: Aug. 30, 1999

Related U.S. Application Data

(60) Provisional application No. 60/031,010, filed on Nov. 15, 1996.

(51) Int. Cl.⁷ .............................................. G03B 21/28
(52) U.S. Cl. ............................. 353/77; 353/28; 353/10
(58) Field of Search .............................. 353/74, 77, 78, 353/28, 30; 359/630, 629

(56) References Cited

U.S. PATENT DOCUMENTS

| | | |
|---|---|---|
| 4,200,366 A | 4/1980 | Freeman |
| 4,671,625 A | 6/1987 | Noble |
| 4,871,231 A | 10/1989 | Garcia, Jr. |
| 5,042,909 A | 8/1991 | Garcia, Jr. et al. |
| 5,082,350 A | 1/1992 | Garcia et al. |
| 5,172,266 A | 12/1992 | Garcia et al. |
| 5,311,357 A | 5/1994 | Summer et al. |
| 5,418,632 A | 5/1995 | Anderson |
| 5,457,508 A | 10/1995 | Ichihara et al. |
| 5,477,394 A | 12/1995 | Shibazaki |
| 5,483,307 A | 1/1996 | Anderson |
| 5,508,763 A * | 4/1996 | Schulte ......................... 353/10 |
| 5,671,992 A | 9/1997 | Richards |
| 5,782,547 A | 7/1998 | Machtig et al. |
| 5,913,591 A * | 6/1999 | Melville ....................... 353/28 |
| 5,944,403 A * | 8/1999 | Krause ......................... 353/74 |
| 5,993,005 A * | 11/1999 | Geranio ........................ 353/10 |

FOREIGN PATENT DOCUMENTS

WO     WO 89/09423     10/1989

* cited by examiner

Primary Examiner—William Dowling
(74) Attorney, Agent, or Firm—Small Larkin, LLP

(57) ABSTRACT

The invention relates to a device for the virtual production of an image, with a housing, an image projection device, which produces an image to be displayed. The housing has an observation opening in a wall of the housing with a fresnel lens arranged therein. Imaging optics arranged in the housing for depicting the object onto the fresnel lens. In order to ensure a large range of applications for this device, provision is made that the imaging optics have a concave mirror arranged in the path of light rays between the image projection device and the fresnel lens. The concave mirror lies opposite the fresnel lens and a ray divider is provided therebetween. To increase the illusion effect, a partially translucent mirror (spy mirror) is additionally arranged on the observation side of the fresnel lens.

11 Claims, 5 Drawing Sheets

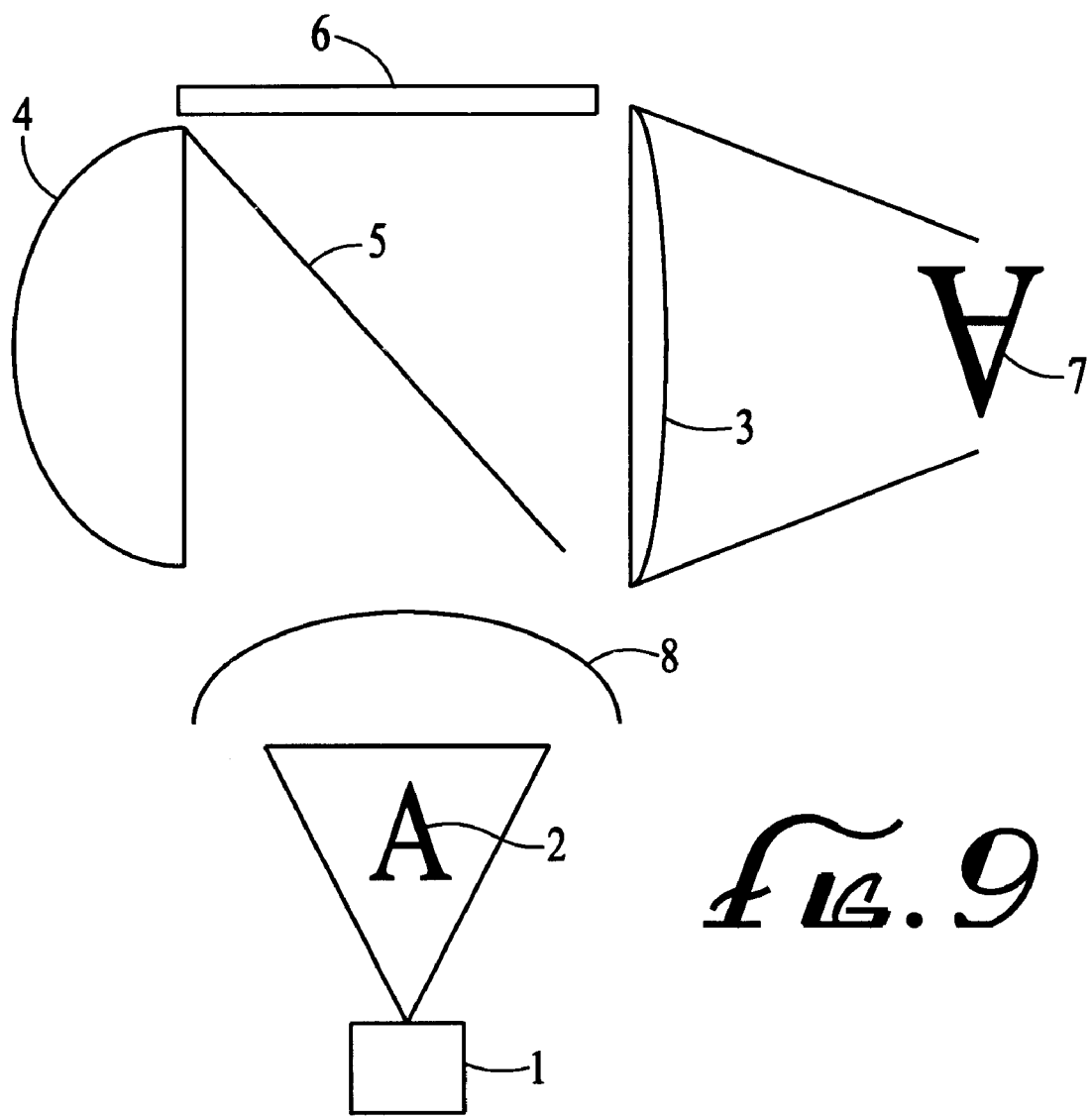

VIRTUAL IMAGE PROJECTION DEVICE

CROSS REFERENCES TO RELATED APPLICATIONS

This application claims the benefit of U.S. Provisional Application No. 60/031,010 filed on Nov. 15, 1996, and Application No. 08/970,553, filed Nov. 14, 1997, now U.S. Pat. No. 5,944,403, which are incorporated herein by reference.

BACKGROUND OF THE INVENTION

A. Field of the Invention

The present invention relates to a device for the virtual display of an image. More specifically the present invention relates to a device for the virtual display of moving images such as video, motion pictures and the like.

B. Discussion of the Prior Art

Devices are known for the production of a virtual image outside of such devices using an illuminated real object which is included fixedly or rotatably within the devices. In one such device, the virtual image is produced outside the housing by means of a fresnel lens which is arranged in the housing opening. The object can either be arranged lying directly opposite the fresnel lens inside the housing or staggered with respect to the fresnel lens, with the object then being depicted onto the fresnel lens by a suitable mirror arrangement. Such a three-dimensional image device is disclosed in European Patent No. EP-B1-0 410 968 by Raul Orlandi.

While suited for their intended purpose, a disadvantage of devices of this type is that only illuminated real objects can be depicted, which is complicated in practice and greatly restricts the use of this image device to objects which can be maintained in the housing. Whereas flat objects can be depicted with such a device with relatively no difficulty, three-dimensional distortions occur in the depicting of objects with greater three-dimensional depth. In addition, the observation of the image is substantially limited to a particular viewing axis, which is determined by the foci of the fresnel lens. In other words, this known device suffers from a very tight viewing angle. To increase the viewing angle, a 3 to 1 size ratio is desired between the object and the lens. Thus, the object is generally 3 times smaller than the lens to increase the viewing angle.

The disadvantages set out above also apply to an alternative embodiment known in which the depiction of the real object takes place by means of a concave mirror arranged in the path of light rays and a partially translucent mirror, instead of with a fresnel lens. Finally, it is disadvantageous that an observer always has to look into the fresnel lens or into the concave mirror in order to observe the object, which is very disturbing due to the enlargement of the mirror image of the observer.

OBJECT AND SUMMARY OF THE INVENTION

An object of the present invention consists of largely eliminating the above-mentioned disadvantages and providing a virtual image device in accordance with the present invention in which the range of applications for the device is expanded and which ensures an undistorted image reproduction of the subject which is to be depicted, with a greater viewing angle than hitherto.

These disadvantages are solved by the features of the virtual image device of the present invention comprising a housing with an observation opening in a wall of the housing, an image source for the virtual image to be depicted, and imaging optics arranged in the housing for projecting the image onto a fresnel lens, located in the observation opening. The imaging optics have a part-spherical mirror arranged in the path of light rays between the image source and the fresnel lens. The image source, which may be a real object, is preferably generated by a two-dimensional (2-D) projection device.

The invention overcomes the problems disclosed above by featuring an improved imaging system based on the combination of a fresnel lens and a part-spherical mirror. The part spherical mirror is preferably a concave mirror, but a convex mirror is acceptable. In addition, as a substitute for the real object disclosed in the prior art, the virtual image is generated by an image projection device that creates a 2-D image at the image source.

According to the invention, through the combination of a concave mirror and fresnel lens, the viewing angle can be increased without a costly (oversized) fresnel lens being used as in the prior art, which is desirably 3 times greater than the image which is to be depicted, for the enlargement of the viewing angle.

Through the use of a 2-D projection device to produce an image at the image source, rather than using a real object, distortions are virtually eliminated. A further advantage of the use of a 2-D projection device to produce an image rather than using a real object is that complex animation can also be depicted without difficulty, for example, several objects can be displayed moving simultaneously. Another feature of the 2-D projection device according to the invention is that a re-adjustment of the device is not required when real objects are exchanged as in the prior art. Furthermore, an opening in the housing of the device necessary for exchanging real objects is not required. Hence, completely new fields of applications become possible for the device according to the present invention, in particular for advertising, because images which are to be projected can be played back in a simple manner by video for example, preferably controlled by computer.

A variety of imaging means come into consideration for the two-dimensional projection device, such as for example a slide or film projector or a video or laser image production device. The video image production device preferably comprises a video projector, a video monitor, a television set, an LCD screen or the like.

BRIEF DESCRIPTION OF THE DRAWINGS

Other objects, advantages, and features of the invention will become apparent from the foregoing detailed description taken in connection with the accompanying drawings, in which:

FIG. 9 is a schematic view of a seventh embodiment of a virtual image device according to the present invention.

DESCRIPTION OF THE PREFERRED EMBODIMENT(S)

Figure 1:
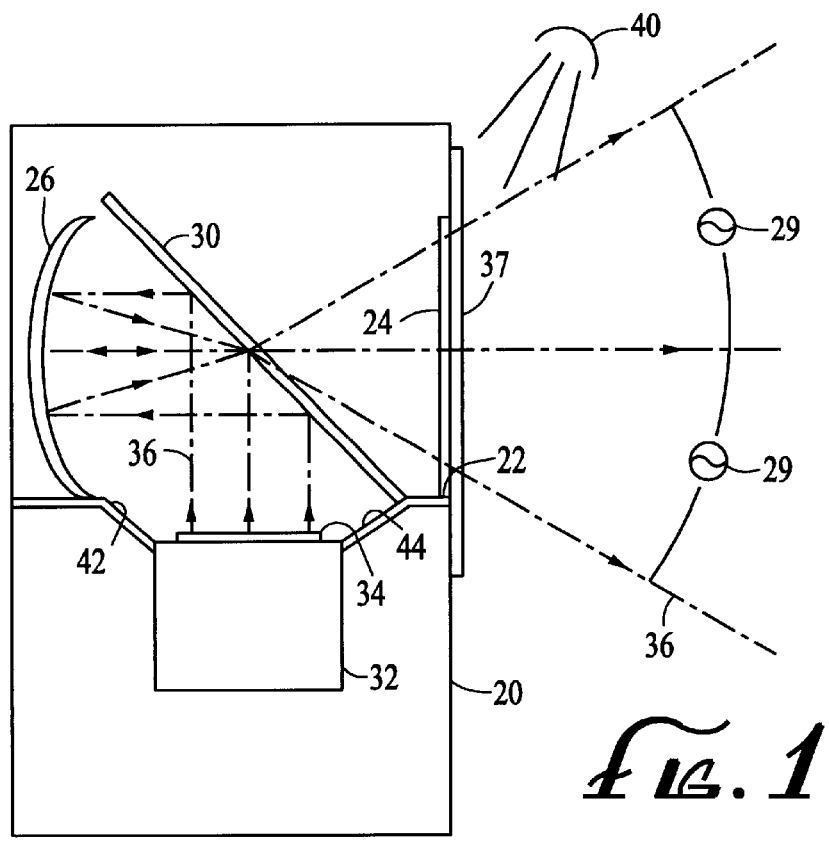
FIG. 1 is a diagrammatic view of a first embodiment of a virtual image device according to the present invention.

The virtual image production device as shown in FIGS. 1–4 for purposes of illustration, generally includes a chamber or a housing 20, which is closed on all sides and has an observation opening 22 in one wall, which opening is closed by a fresnel lens 24 which runs co-planer to this wall. The fresnel lens 24 is part of an imaging arrangement which in both embodiments of the device shown in FIGS. 1–4 has a concave mirror 26 which is arranged opposite the fresnel lens 24 in the housing 20. A ray divider 30 in the form of a partially translucent mirror is arranged between the concave mirror 26 and the fresnel lens 24.

The imaging arrangement with the elements 24, 26 and 30 produces a virtual image 28 (FIGS. 3 and 4) on the exterior of the housing 20 that appears to an observer (not shown) to be in front of the fresnel lens 24. The field of view of the observer is shown by reference numeral 29 (FIGS. 1 and 2).

Figure 2:
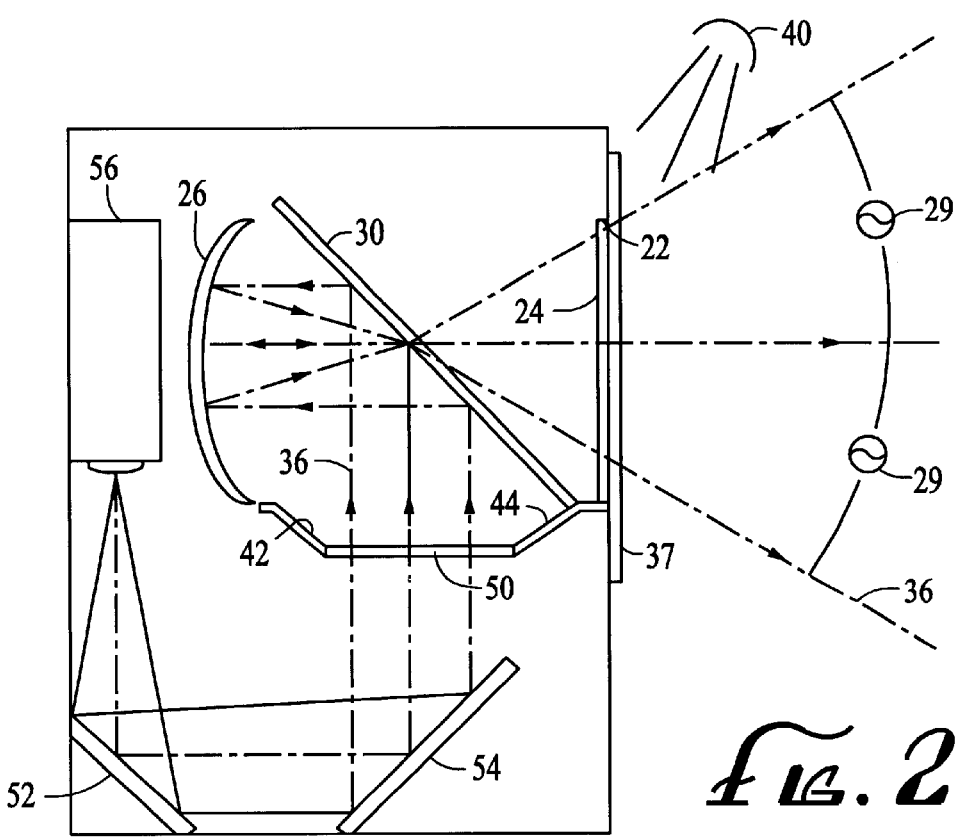
FIG. 2 is a diagrammatic view of a second embodiment of a virtual image device according to the present invention.
Figure 3:
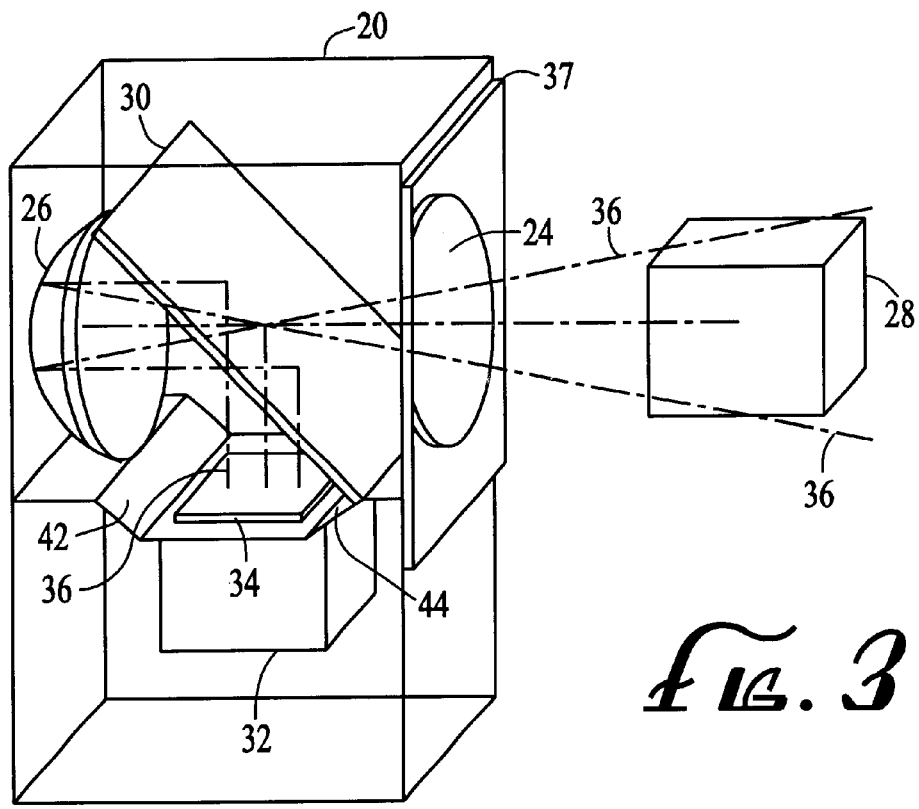
FIG. 3 is a perspective view of the present invention as shown in FIG. 1.

In the embodiment of the device illustrated by FIGS. 1 and 3, the image is produced by means of a 2-D projection device or video display 32 such as a video-monitor, television or computer monitor, with a screen 34 of the display 32 pointing towards the ray divider 30. The screen 34 is positioned relative to the ray divider 30 to function as the image source. As indicated by reference numeral 36, light rays originate from the screen 34, extend to the ray divider 30, reflect onto the concave mirror 26 and from this, are directed through the ray divider 30, onto the fresnel lens 24 to define a light ray path.

The use of the ray divider 30 which is arranged between the concave mirror and the fresnel lens 24 lying opposite thereto and directs the light rays 36 from the display device 32 onto the concave mirror 26 is advantageous for the compact structure of the device. Advantageously, the ray divider 30 is coated so as to be anti-reflective on its face directed towards the fresnel lens 24 and so as to be reflecting on its other face, facing the concave mirror 26.

According to a particularly advantageous further development of the invention, a partially translucent mirror 37, a so-called "spy mirror", is arranged on the viewing side of the fresnel lens 24, i.e., outside the housing 20, which mirror 37 prevents visibility into the housing. Owing to this partially translucent mirror 37, which has preferably a transmission capacity of 5%, the illusion of a virtual image 28 appearing in front of the device is perfected for the observer, because in this mirror 37 the observer sees exclusively his/her own mirror image undistorted and in the original size together with the virtual image 28. Preferably, the partially translucent mirror 37 is illuminated by an external light source 40 from the observer's side. Through the use of the partially translucent mirror 37 in cooperation with the external light source 40, the illusion effect of a virtual image 28 standing in the space in front of the housing 20 is increased.

In order to avoid undesired reflections inside the housing 20, its inner walls are produced from non-reflective material. Likewise, partition walls 42 and 44, which close the space between the concave mirror 26, the ray divider 30 and the screen 34 are produced from non-reflective material.

Figure 4:
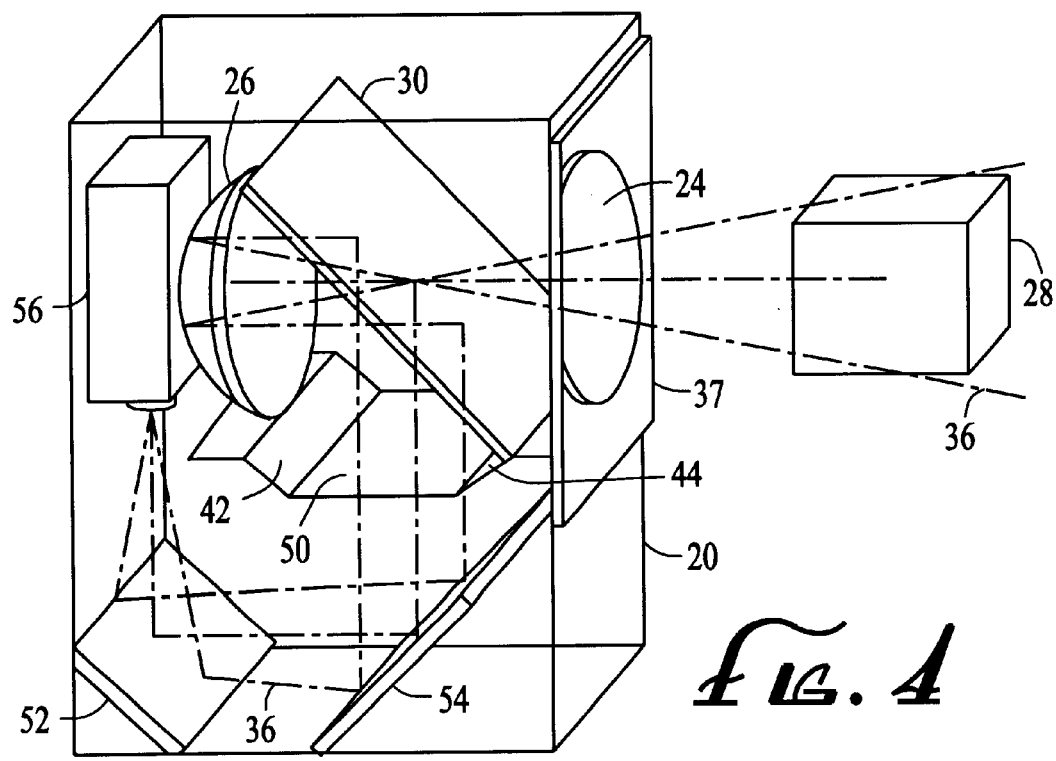
FIG. 4 is a perspective view of the present invention as shown in FIG. 2.

In an alternative embodiment of the device according to the invention, shown in FIGS. 2 and 4 where like reference numerals with FIGS. 1 and 3 refer to like structure, a back projection medium 50 is positioned relative to the ray divider 30 to function as the image source. The back projection medium 50 (FIGS. 2 and 4) is positioned at the site of the screen 34 (FIGS. 1 and 3), onto which a 2-D image is projected by means of deflector mirrors 52 and 54 (FIGS. 2 and 4) from an image projector 56, for example a video, laser, slide or film projector. Using the arrangement of the concave mirror 26, ray divider 30 and fresnel lens 24, the virtual image is produced from the image formed on the back projection medium 50 in the same manner as in the device of FIGS. 1 and 3 using the display screen 32. The back projection medium 50 is preferably made from conventional flat material capable of back projection which generally requires a partially transparent material having a light intercepting medium on which two-dimensional images may be viewed, for example a cloth movie screen, a fog screen, water screen, or other medium which allows the projected 2-dimensional images to be viewed.

In summary, the invention relates to a device for the production of a virtual image, with a housing 20, a screen 34 or back projection medium 50, which produces an image to be displayed. The housing has an observation opening in a wall of the housing 20 with imaging optics arranged in the housing 20 for projecting the object onto a fresnel lens 24 which is arranged in the observation opening. In order to ensure a large number of applications for this device, the imaging optics have a concave mirror 26 arranged in the path of light rays 36 between the image source 34 or 50, which provides the virtual image to be displayed, and the fresnel lens 24. The image to be depicted is generated by a two-dimensional projection device 32 and 56. Advantageously the concave mirror 26 lies opposite the fresnel lens 24 and a ray divider 30 is provided therebetween. To increase the illusion effect, a partially translucent mirror 37 (spy mirror) is additionally arranged on the observation side of the fresnel lens 24.

With reference to FIGS. 1–4, an example of the virtual image device of the present invention is constructed from the following:

a ray divider 30, 400×550 mm in size, having a 2 sided coating, 1 coating reflective at 45 degrees, 1 coating non-reflective, and providing 50% light transmission;

a concave mirror 26, 350 mm in diameter, having a focal length=600 mm;

a fresnel lens 24, 406 mm in diameter, having a focal length=558 mm; and a semitransparent mirror 37, having a 5% light transmission.

It will be appreciated by those skilled in the art that a convex mirror (not shown) having generally the same optical properties may be substituted for the concave mirror 26; however, the arrangement of the convex mirror, ray divider 30 and fresnel lens 24 would need to be adjusted accordingly.

When these components are arranged as shown in FIGS. 1–4, a virtual image 28 is produced generally 55.8 cm in front of the housing 20 with a field of view in the range of 20 to 25 degrees about a line perpendicular to a plane formed by the observation opening as indicated by reference numeral 29. Alternatively, when used with a fresnel lens 24 having focal length of 400 mm, the image 28 is formed 30 cm in front of the housing 20.

Figure 5:
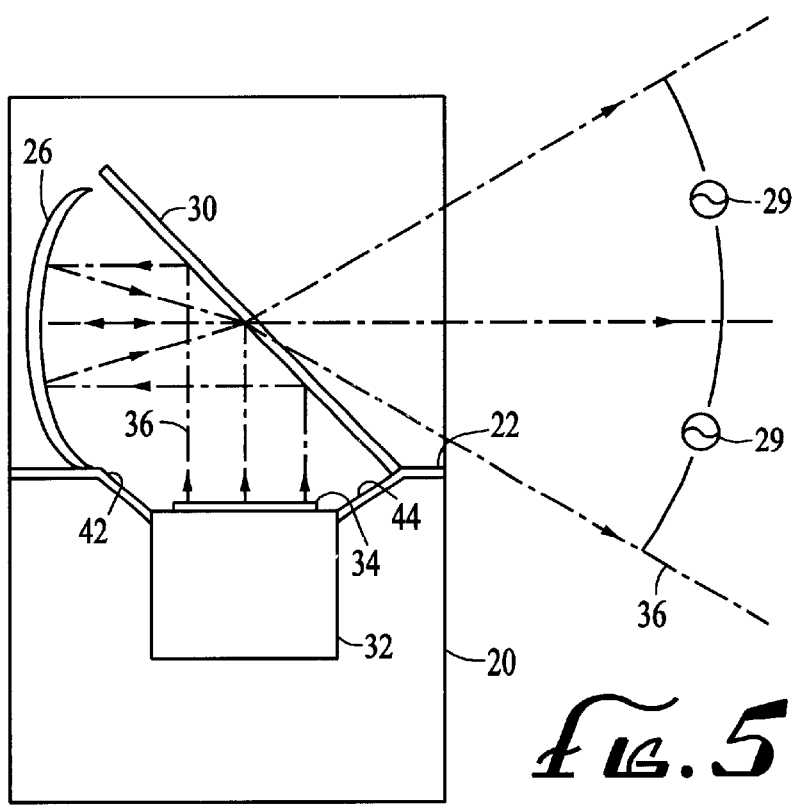
FIG. 5 is a diagrammatic view of a third embodiment of a virtual image device according to the present invention.
Figure 6:
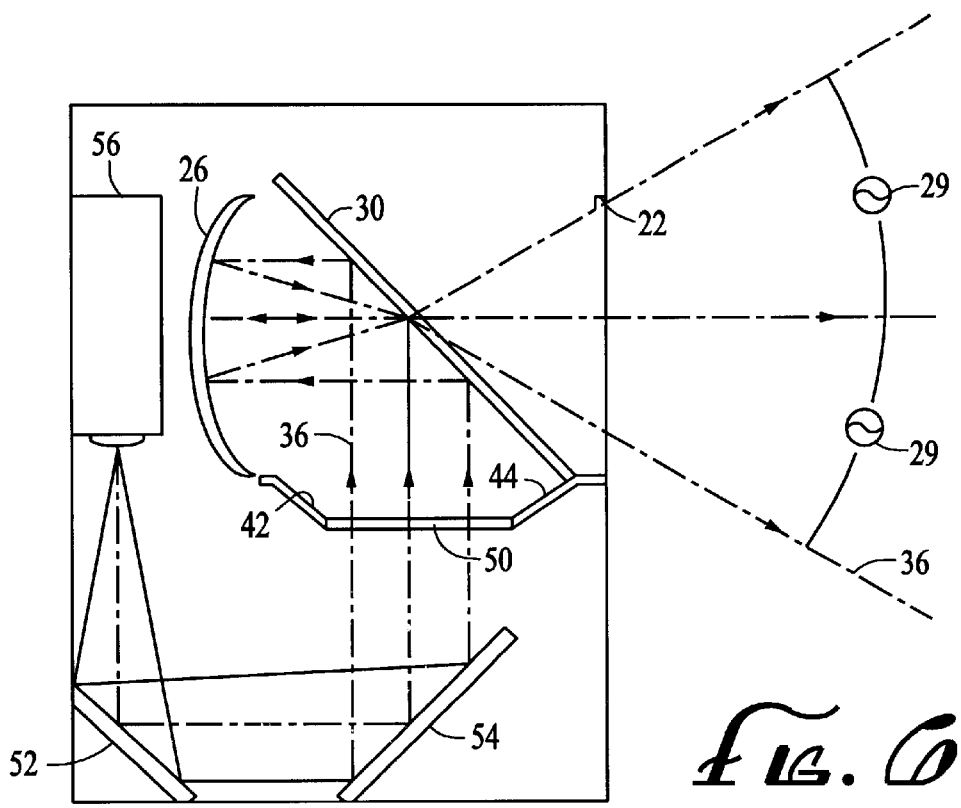
FIG. 6 is a diagrammatic view of a fourth embodiment of a virtual image device according to the present invention.

With reference to FIGS. 5 and 6 two other alternate embodiments will be described. The embodiment of FIG. 5 corresponds to the embodiment of FIGS. 1 and 3, with like reference numerals indicating like parts in all three figures, except that in the embodiment of FIG. 5 the fresnel lens 24 and the partially translucent mirror 37 have been removed. It has been discovered that a useful projection will result even without the use of these two components.

The embodiment of FIG. 6 is like that of FIGS. 2 and 4, except for the removal of the fresnel lens 24 and 37. In the FIG. 6 embodiment, like reference numerals refer to like components as illustrated and described with reference to FIGS. 2 and 4. It has been discovered that useful projection will result even though the fresnel lens and the partially translucent mirror are not used.

Figure 7:
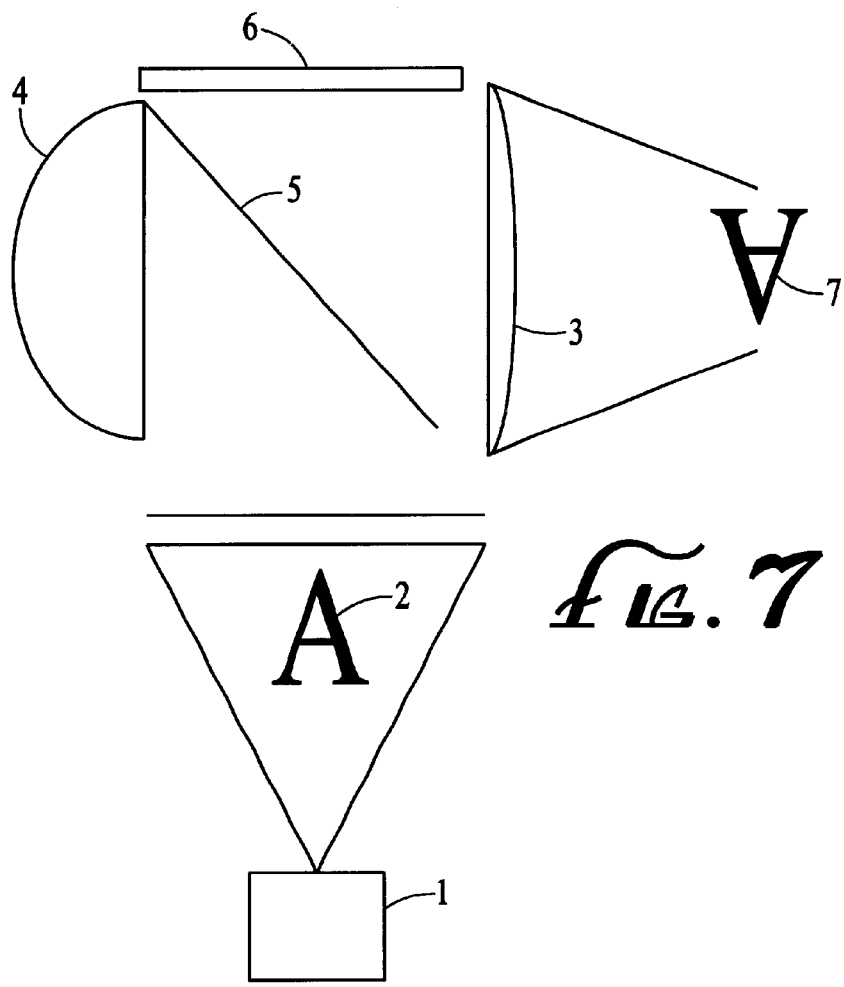
FIG. 7 is a schematic view of a fifth embodiment of a virtual image device according to the present invention.

With reference to the schematic drawing of FIG. 7, another alternate embodiment will be described. Projection device 1, which may be a laser projection device, video or other conventional two-dimensional projection device projects an image 2, here represented by an "A". In this embodiment a fresnel lens is used as the output lens 3. A concave mirror 4 is used to reflect an image reflected from one side of the beam splitter 5 and the projected image 7 is shown as an upside down "A". All of these components are configured and positioned within a housing as described above with respect to FIGS. 1–6. In the embodiment of FIG. 7, an LCD (liquid crystal display) screen or a television screen, or any other projection device may be used to project a background image or animation. In this embodiment the projection device 6 is used to provide a background image and, within the scope of the invention provides for the simulation of depth, and creation of a depth perception in the combined projected image. Thus, the combined projected image will include the projected image from the image 2 and projected background image. The projected image 7 will be viewed against a background, and thus, to the viewer, a depth perception will result. The background image or animation, however, will appear to be inside the box.

Figure 8:
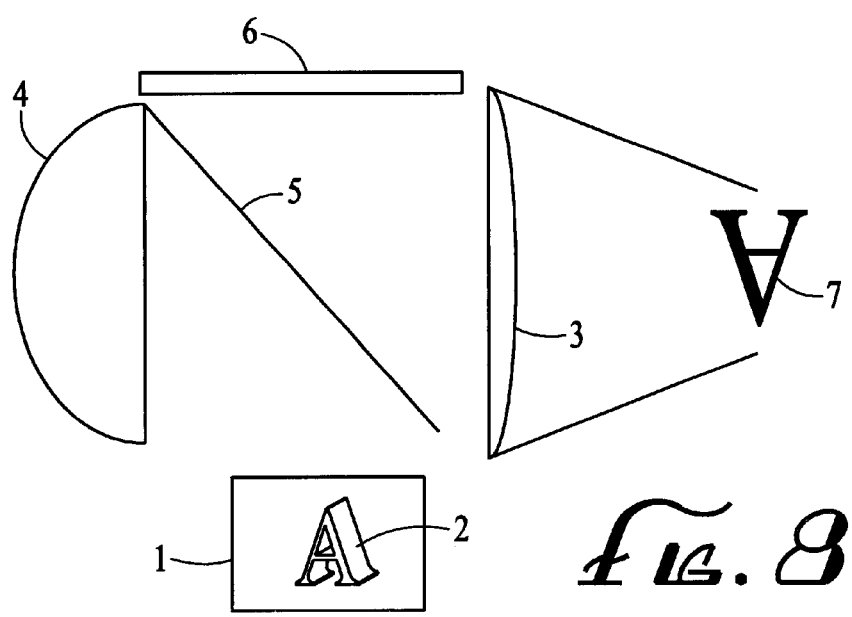
FIG. 8 is a schematic view of a sixth embodiment of a virtual image device according to the present invention.

With reference to the schematic drawing of FIG. 8, another alternate embodiment of the present invention will be described. In the FIG. 8 embodiment, reference numerals 3–7 refer to like components in the FIG. 7 embodiment and can be used in conjunction with the housing and other components of the FIGS. 1–6 embodiments In FIG. 8, a volumemetric projection 1, is used so that the output image will also appear to be volumemetric, i.e., not flat. The volumemetric display device 1 can be any conventional volumemetric display device which in turn produces a volume metric, i.e., one having perspective and/or the appearance of three dimensions such as the volumemetric form of the shape "A" 2 as shown in FIG. 8.

With reference to the schematic drawing of FIG. 9, another alternate embodiment of the present invention will be described. In the FIG. 9 embodiment reference numerals 1–7 refer to identical components of like reference numerals 1–7 of the FIG. 7 embodiment. In the FIG. 9 embodiment a special, non-flat screen, preferably concave, is used, as shown in FIG. 9, and upon which the image 2 is projected. This screen is preferably concave, and is advantageous for projecting curved shapes such as globes to represent the earth, planets and so forth. Alternatively, the screen 8 may have other, non-flat shapes, such as the shape of a face or other three dimensional shapes so that the output image 7 will have a volumemetric, that is perspective, rather than a flat output image. As with the FIGS. 7 and 8 embodiments, the components in FIG. 9 may be placed in and used with the projection box and other components as shown and described with respect to FIGS. 1–6.

While the present invention has been described in connection with what are presently considered to be the most practical and preferred embodiments, it is to be understood that the invention is not to be limited to the disclosed embodiments, but to the contrary, is intended to cover various modifications and equivalent arrangements included within the spirit of the invention, which are set forth in the appended claims, and which scope is to be accorded the broadest interpretation so as to encompass all such modifications and equivalent structures.

What is claimed is:

1. A device for the production of a virtual image, comprising:
   a housing having a wall with an observation opening formed therein;
   an image source located in said housing;
   a fresnel lens arranged in said observation opening;
   imaging optics arranged in the housing for projecting light rays conveying said virtual image in a path from said image source onto said fresnel lens, said imaging optics having
      a concave mirror positioned in said path of said light rays between said image source and said fresnel lens; and
      a ray divider positioned between said concave mirror and said fresnel lens for reflecting said light rays from said image source onto said concave mirror and for transmitting said light rays from said image source onto said concave mirror and for transmitting said light rays from said concave mirror to said fresnel lens;
   a first projection device located within said housing and adapted to generate an image at said image source; and
   a second projection device adapted to project an image toward said ray divider, whereby a background virtual image is formed.

2. The device according to claim 1 wherein said second projection device is of the group consisting of:
   a slide projector;
   a film projector; and
   a laser projector.

3. The device according to claim 1 wherein said second projection device is of the group consisting of:
   a television monitor;
   a video monitor; and
   a liquid crystal display.

4. The device according to claim 2, wherein said first projection device is a volumetric projection device adapted to produce an output image having a volumetric appearance.

5. The device according to claim 1 further including a non-flat screen positioned between said first projection device and said second projection device.

6. The device according to claim 1 further including a concave screen positioned between said first projection device and said second projection device.

7. A virtual image device for generating virtual images that can be viewed in the space in front of said device comprising:
   a housing having dark, opaque non-reflecting walls and one of said walls formed with an observation opening;
   a first image source;
   a second image source positioned opposite said first image source;
   a concave mirror positioned adjacent said second image source and opposite said opening;
   a ray divider positioned opposite said opening, between said first image source and said second image source, and having a non-reflective coating on one side;

a Fresnel lens having an observation side and mounted in said observation opening; and a semi-transparent mirror overlying said observation side of said fresnel lens.

8. The virtual image device according to claim 7 further including:

a first projection device for transmitting images to said first image source on which two-dimensional images may be viewed; and a second projection device for transmitting images to said second image source on which a background image for said first image source may be viewed.

9. The virtual image former according to claim 8 wherein said first projection device is a volumetric projection device.

10. The virtual image former according to claim 7 further including a non-flat screen positioned between said first image source and said second image source.

11. A device for the production of a virtual image, comprising:

a housing having a wall within an observation openings formed therein;

an image source located in said housing;

a fresnel lens arranged in said observation opening; and imaging optics arranged in the housing for projecting light rays conveying said virtual image in a path from said image source onto said fresnel lens; said imaging optics having a concave, part-spherical mirror positioned in said path of said light rays between said image source and said fresnel lens and lying opposite said fresnel lens; and a ray divider positioned between said concave mirror and said fresnel lens for reflecting said light rays from said image source onto said concave mirror and for transmitting said light rays from said concave mirror to said fresnel lens.

* * * * *